INVENTORS
ROBIN BEACH
NICHOLAS S. HARE

BY

ATTORNEY

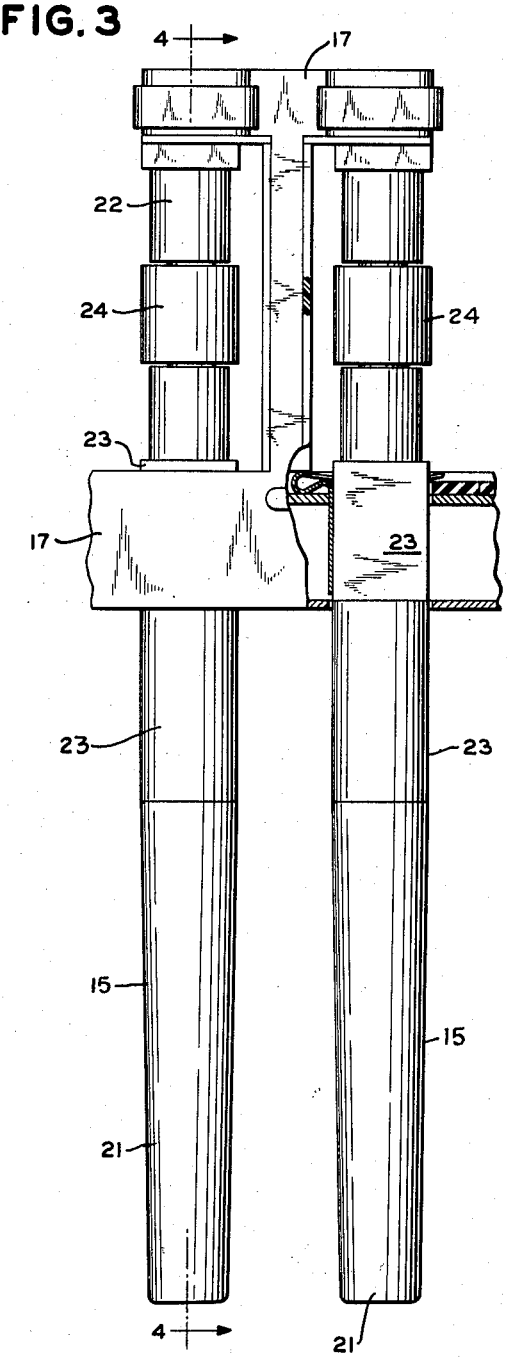
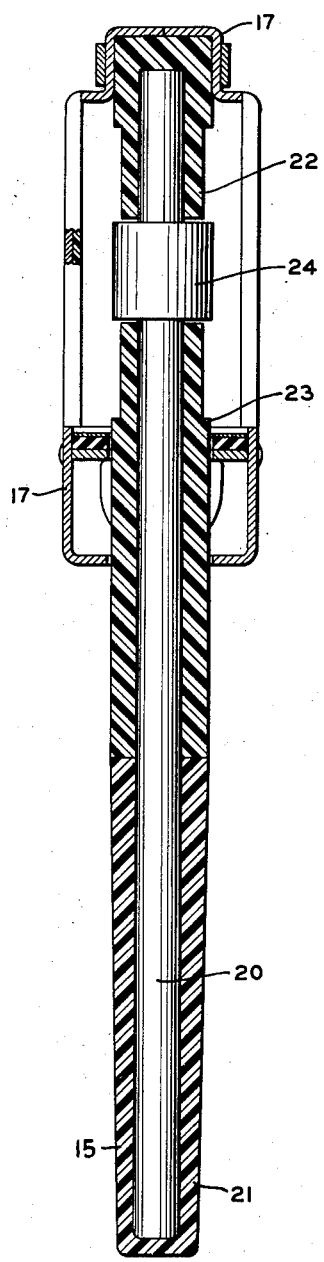

June 10, 1958 R. BEACH ET AL 2,837,886
COTTON PICKING UNIT WITH ELECTROSTATICALLY
CHARGED SPINDLES
Filed Aug. 24, 1954 6 Sheets-Sheet 3
FIG. 5
FIG. 6
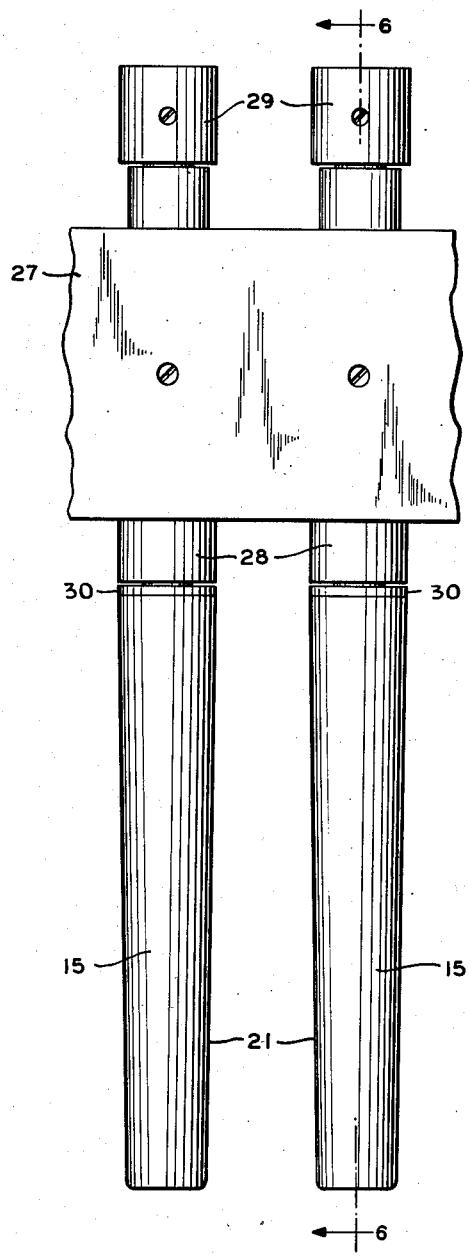
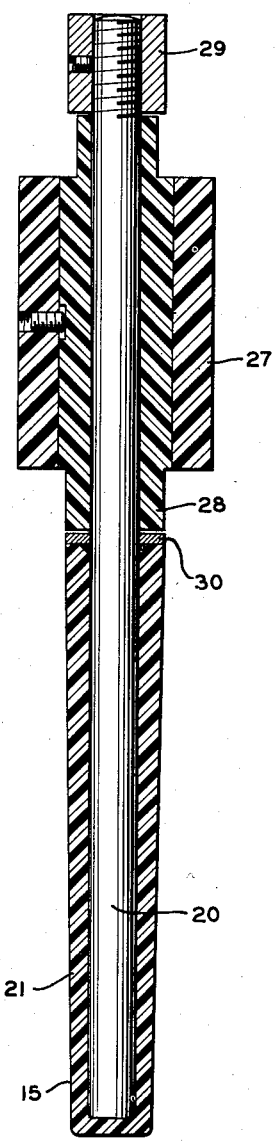
INVENTORS
ROBIN BEACH
NICHOLAS S. HARE
BY
ATTORNEY

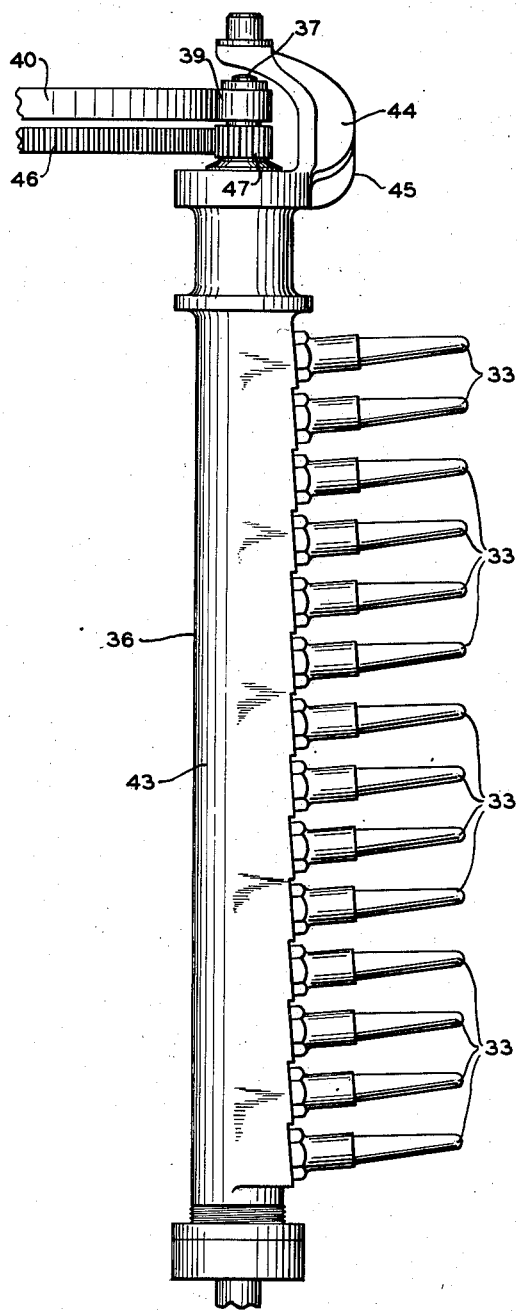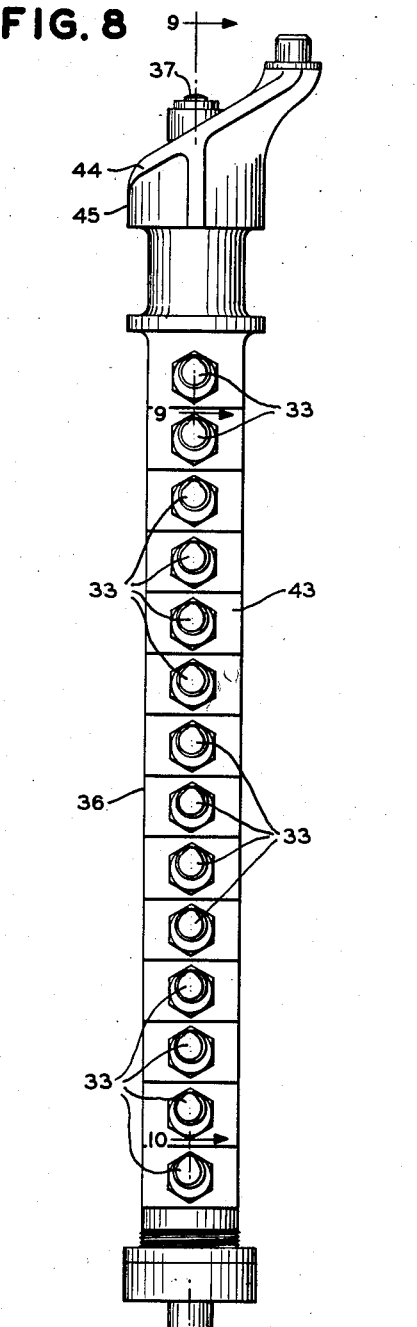

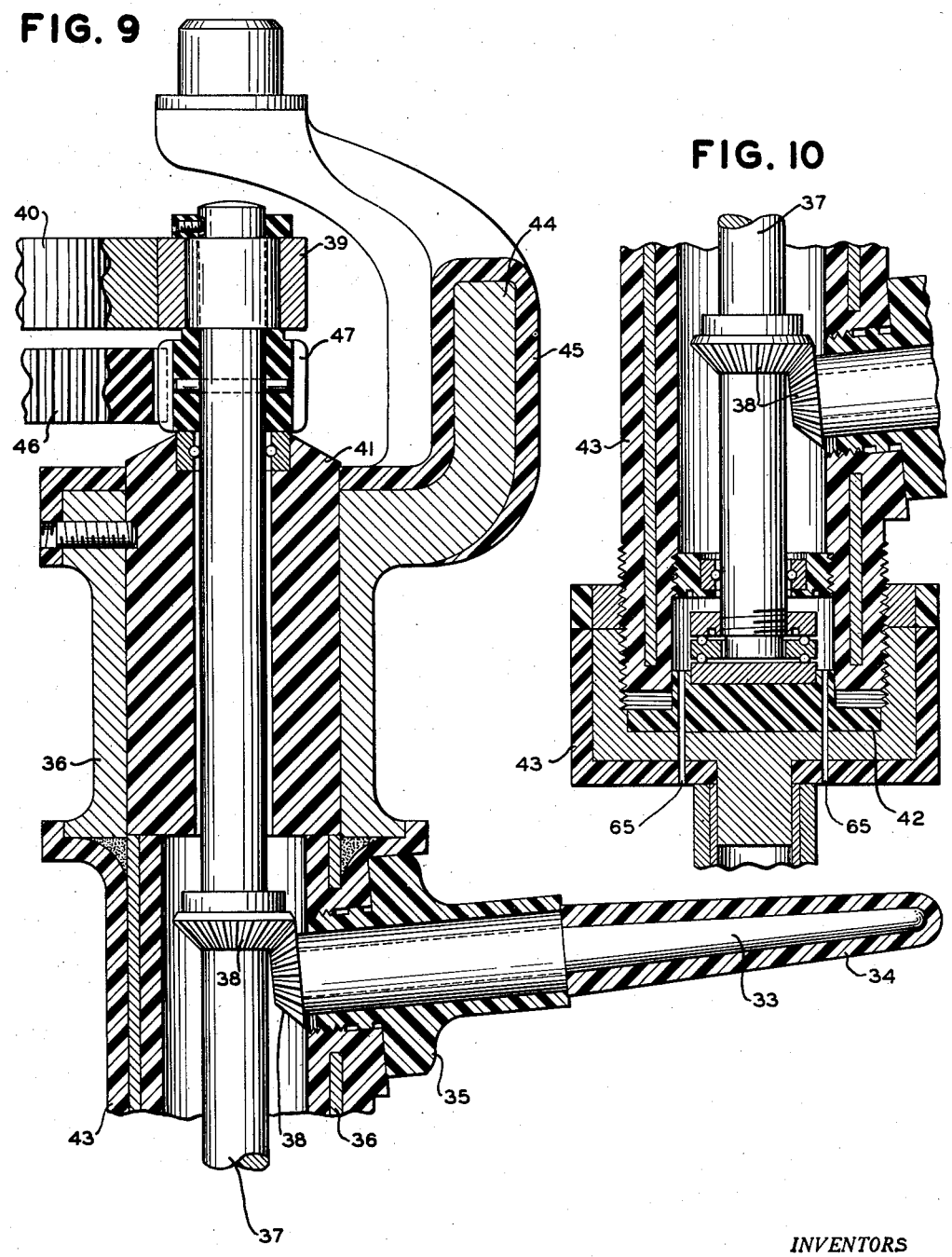
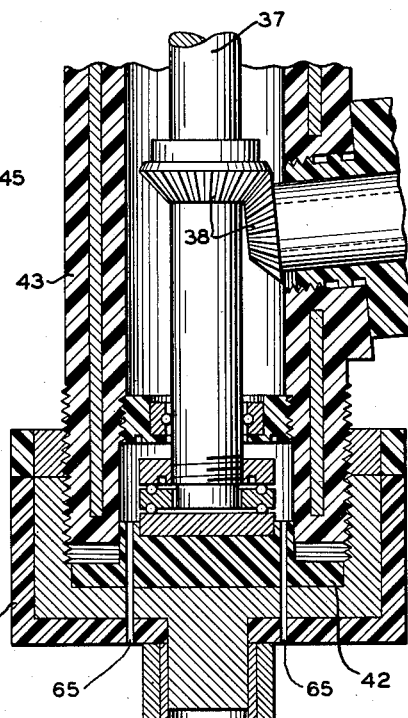

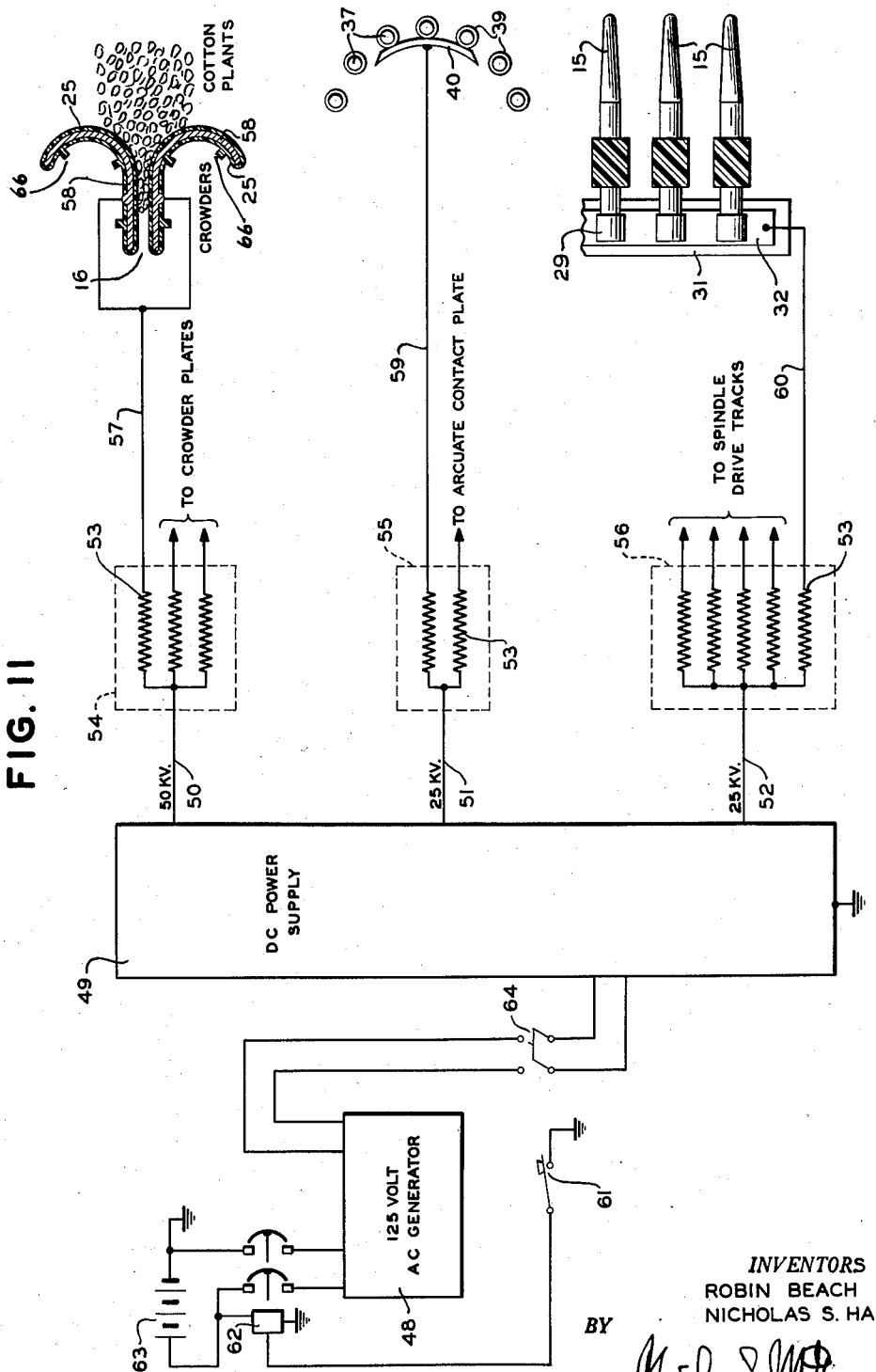

United States Patent Office 2,837,886
Patented June 10, 1958

2,837,886

COTTON PICKING UNIT WITH ELECTROSTATICALLY CHARGED SPINDLES

Robin Beach, Brooklyn, N. Y., and Nicholas S. Hare, Monroeville, Ala.

Application August 24, 1954, Serial No. 451,838

10 Claims. (Cl. 56—42)

The invention disclosed in this patent application relates to cotton pickers of the mechanical type in which rotating picker spindles are driven into the fruited cotton stalks massed in a picking tunnel and the spindles given retrograde movement as the machine progresses, thus to maintain a relatively stationary relation in respect to the plants being picked.

In these operations much cotton is knocked or dropped to the ground and lost.

These machines depend for their effectiveness upon the rotating spindles actually contacting the ripened cotton fibre and accomplishing physical adherence of the fibre to the spindles.

This necessitates a multitude of spindles to accomplish physical engagement with the cotton bolls, and even with a great number of spindles many of the bolls naturally are missed and left unpicked in the field.

Various methods have been proposed for effecting adherence of the cotton fibre to the spindles, such as roughening or fluting or providing the spindles with sharp, hook-like barbs. These expedients have a tearing and breaking effect more or less damaging to the picked cotton and injurious to the unopened bolls.

To gain attachment of the fibres to the spindles it has become a general practice to wet the spindles. This has a degrading and soiling effect and causes the cotton at times to mass and tangle and to impede the stripping and doffing operations. The dampened cotton also complicates ginning.

The use of water for wetting the spindles introduces mechanical problems and special servicing needs. The water on the spindles also promotes discoloration and staining of the cotton. Special attention is required to feed the water evenly and in the optimum amount. Moreover, in cold weather the water moistening system many times freezes.

General objects of the present invention are to avoid the difficulties and objections of conventional machines such as mentioned, and particularly to eliminate the loss, waste and degrading of cotton resulting from use of such machines.

More particularly it is a purpose of the invention to garner as nearly as possible all the ripe fibre, to prevent injury and degrading of the cotton and to reduce cotton lost on the ground or left unpicked on the plants.

These objects are accomplished by drawing the cotton through electrostatic attraction to the spindles, thus getting away from limitations of the casual physical contact of cotton fibre with the spindles.

Special objects of the invention are to accomplish all the foregoing with a practical, efficient, compact, low cost machine adapted to present field and service conditions.

The foregoing and other desirable objects are attained by the novel features of construction, combinations and relations of parts, all as hereinafter set forth in detail and broadly covered in the claims.

The drawings accompanying and forming part of the specification illustrate different practical embodiments of the invention but it will be appreciated that structure, facilities and arrangement may be modified and changed in various ways, all within the true intent and full scope of the invention as hereinafter defined and claimed.

Basically the invention comprises the applying of an electrostatic charge to the picking spindles and inductively to the cotton being picked, thus in effect creating an attractive force reaching out and drawing the cotton to the spindles, gaining contact thereby with cotton which otherwise would not be contacted. These electrostatic forces pull the fibre to the spindles and cause it to adhere to the spindles, thus assisting the wrapping operation and eliminating loss by dropping the cotton.

The invention thus comprises further the preconditioning of the cotton in the open bolls by induced electrostatic force so as to cause the individual fibres to stand and reach out for the rotating picker spindles entering the picking zone.

Preferably and additionally the lifters and crowders and the roof and sides of the tunnel and means for guiding the plants into the picking zone are electrically charged to lift and more or less levitate the cotton, making it ready for attraction to the picker spindles.

To make this disclosure as complete as possible and readily intelligible to those skilled in the art, the invention is shown as combined with the two well-known types of machines currently in use—the Rust machine of Patent 2,085,046, dated June 29, 1937, and the Johnston machine of Patent 2,140,631, dated December 20, 1938.

Fig. 1 in the drawings is a broken plan view of the picking zone portion of a Rust machine having this invention incorporated therein;

Fig. 3 is a further enlarged broken part sectional detail of two of the insulated spindles in a supporting slat;

Fig. 4 is a longitudinal sectional view of one of the spindles and slat as on substantially the plane of line 4—4 of Fig. 3;

Figs. 5 and 6 are views of a modified form of an all-insulation form of slat construction and spindle, Fig. 5 being a broken front elevation and Fig. 6 a sectional view as on line 6—6 of Fig. 5;

Figs. 7 and 8 are broken front and side views, respectively, of a spindle carrying picker bar such as disclosed in the Johnston Patent 2,140,631, modified and changed to incorporate the present invention;

Figs. 9 and 10 are enlarged broken sectional detail views showing upper and lower end construction of the rebuilt insulated picker bar, these views taken respectively on the lines 9—9 and 10—10 of Fig. 8;

Fig. 11 is a wiring diagram illustrating in the one view how the necessary electrical equipment may be applied to machines on the order of those disclosed in the Rust and Johnston patents identified.

Figure 1:
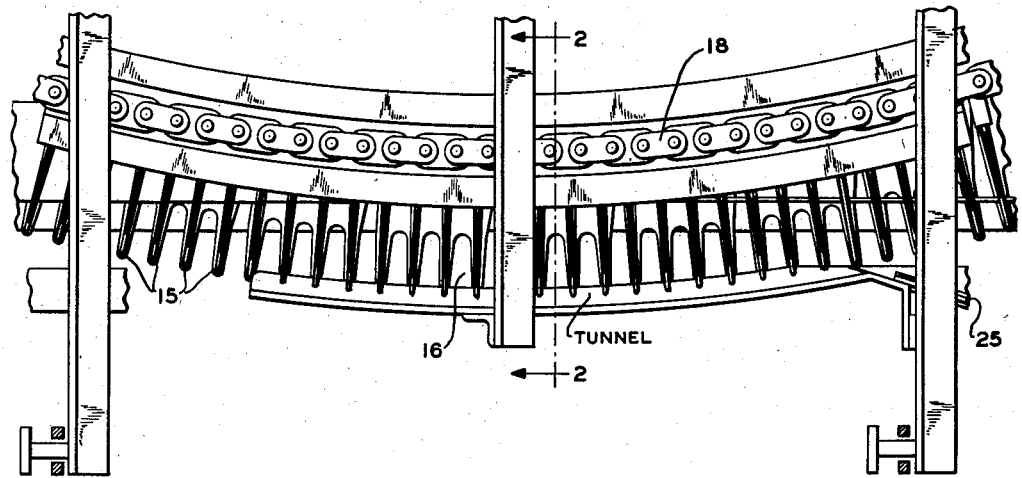

In Fig. 1 the rotary picker spindles 15, of electrically insulated construction, are shown entering and leaving the tunnel 16 which in this case defines the cotton picking zone.

Figure 2:
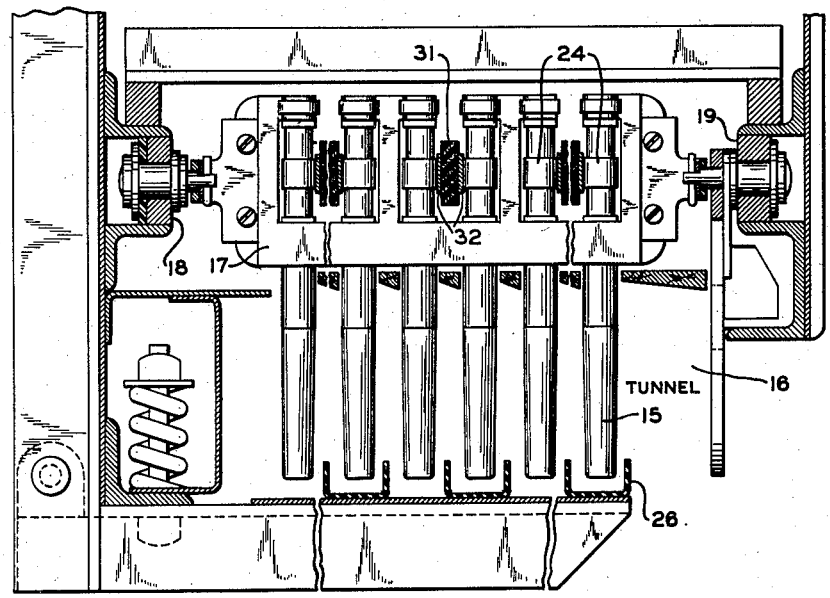
Fig. 2 is an enlarged and broken sectional view as on substantially the plane of line 2—2 of Fig. 1, showing how the insulated picker spindles are electrically charged as they enter the picking zone by making running engagement with electrically conducting transmission strips or tracks.

Fig. 2 shows how the insulated cotton gathering spindles are carried by the slats 17 pivotally supported on the link pins of the upper and lower chains 18, 19.

Figs. 3 and 4 show how the insulation of the picker spindles may be effected by covering the metallic cores 20 of the spindles with covers or thimbles 21 of insulation and by supporting these metallic cores in inner and outer bearings 22, 23 of insulating material.

The section of spindle in each case between the inboard and outboard bearings 22, 23 is shown as having a metallic roller 24 affixed thereto to constitute part of the means for conducting the electrostatic charge as well as mechanical means for imparting rotation to the spindle.

The bearings may be composition material such as nylon, Alsimag, steatite or other strong, non-hygroscopic, wear resistant, heat resistant, high quality dielectric ceramic or plastic.

The coating or covering over the protruding cotton picking portion of the spindle may be a strongly adherent, extruded and cured cover of rubber or plastic such as polyethylene or polytetrafluoroethylene or the like, and this cover may be of a gradual taper terminating in a rounded end.

The insulating coating of the spindles, the insulating bearings for the spindles and all insulation used may have an overcoating of silicone liquid air drying resin for improving hygroscopic properties and increasing, under conditions of high humidity, the surface electrical resistance.

On the spindles the silicone resin overcoating is particularly desirable as adding wax-like adhesive properties for holding the cotton lint once contact is made. Smooth surfaces of polytetrafluoroethylene possess similar properties even without the overcoating of silicone resin.

The current conducting drive rollers 24 are rotatably centered between the inner and outer bearings, which serve in effect as thrust bearings.

In view of the fact that the spindles are rotated only about one-third of the time cycle, oil lubrication may not be necessary, particularly if low friction insulating bearing materials are chosen. If found necessary, however, ball bearing thrust collars, radial bearings or combination radial and thrust bearings may be employed.

Suitable lifters, crowders, stalk guards and the like may be employed for lifting, directing and compressing the plants entering the tunnel, and Figs. 1 and 11 indicate at 25 how such devices, including the sides and roof of the tunnel, may be insulated, preferably with the same or equivalent materials as used on the spindles.

Fig. 2 shows how channels 26 for protecting the tips of the spindles may be mounted on the curved outer wall of the picking tunnel, these being shown as of insulating material preferably having the qualities heretofore described.

Structure may be simplified as shown in Figs. 5 and 6, by using slats 27 of tough, strong insulating material such as Tenite or other plastics now available or possibly under development, of superior quality and suitable to the purpose, these slats carrying elongated bearings 28 for the spindles.

In these views the spindles are shown as each carrying a conducting drive roller 29 on the outer end and a thrust washer 30 for engagement with the elongated bearing. This thrust element may be a ball thrust bearing.

The tracks for imparting rotation and electrostatically energizing the insulated spindles as they enter the picking zone are shown in Figs. 2 and 11 as made up of rubber or other suitable insulating strips 31 supported horizontally in stationary relation between adjoining spindles and carrying conductive strips 32 on opposite sides engageable by the drive rollers 24 or 29 on those spindles.

These spindle driving and conducting tracks are so disposed and of such extent as to impart rotation and carry electrical energy to the spindles only in that stage in which the spindles are in the active picking zone.

For the rest of the travel the spindles remain electrically inactive and deenergized. This, amongst other advantages, avoids unwanted discharge of electrical energy through unnecessary ionization and otherwise. The deenergization of the spindles as they leave and are clear of the picking zone is practically instantaneous and is important so as to permit electrostatically releasing the cotton gathered on the spindles for quick and clean stripper and doffer action, the machine preferably carrying strippers and doffers which may be of conventional design.

In the drum type machine disclosed in the Johnston patent the picker spindles are carried by tubular supports ordinarily referred to as bars, mounted for rotative adjustment in the driving drums.

The present invention departs from that disclosure particularly in isolating and insulating the spindles and the drive shafting extending down through the bars and in applying the electrostatic charging current to conducting rollers mounted on the upper ends of the shafting.

Figs. 7 to 10 illustrate the new structure, it being noted that the tapered spindles 33 are wholly covered with insulation at 34 and are journaled in insulating bearings 35 set in the side of the tubular supporting bar 36, with the center drive shaft 37 which operates the spindles through bevel gearing 38 carrying at its extreme upper end a conducting roller 39 for engagement with an arcuate contact plate or track 40.

The upper and lower bearings for the upright drive shafts 37 are shown as insulated at 41, 42, Figs. 9 and 10, and the main portions of the spindle supporting bar are shown as fully insulated at 43. The lower bearing may have oil drips 65.

Also, the crank arm 44 at the top for oscillating the spindle bar is shown as insulated at 45 and the gear and pinion drive 46, 47 for operating the drive shaft are shown as of insulating material, the latter possibly such as the timing gears used in automotive engines. All such insulation may be the same as heretofore described or satisfactory equivalent.

While electric values may vary, it has been found that 15 to 25 kilovolts provide a sufficiently intense range of potentials applied to the insulated rotating picker spindles to vigorously attract strands of cotton from open or nearly open bolls, with approximately 20 kilovolts as a desirable intermediate practical potential.

It has been found, however, that about 40 kilovolts may be best for the insulated plates or other parts of the plant crowders, lifters, tunnel and other stationary parts at the entrance to and within the picking tunnel.

The power supply for such values may be provided by a reasonably inexpensive 125-volt, 250 watt alternator driven at normal speed by a power take-off from the tractor engine with field excitation obtained from storage battery.

Such a supply source is indicated in the wiring diagram, Fig. 11, where the A. C. generator 48 is connected into a D. C. power supply 49 having a 40 to 50 kv. take-off lead 50 and two 20 to 25 kv. leads 51, 52.

Resistors 53 in the output circuits reduce the available current to microampere proportions, thus to avoid possibilities of shock or injury and arcing or fire hazards.

The resistors are shown mounted in suitable and appropriately identified panel boxes 54, 55, 56, the first having a connection or connections 57 leading to the crowders 58, lifters and other such elements, the second box shown as having a supply connection 59 extending to the segmental energizing track 40 and the third box shown as having connections 60 for carrying current to the spindle driving and energizing tracks.

The panel boxes 55 and 56 are used alternatively for the two types of machines herein referred to.

With the electrical layout disclosed, a simple form of control may be employed such as a push-button switch 61 in convenient reach of the operator, for energizing a magnetic circuit closer 62 for connecting the generator field to the storage battery 63. Then upon closing main switch 64 the generator may be directly connected with the D. C. power supply.

While present operations indicate that positive polarization of the electrified insulated parts may be best, negative polarization may be used or the polarity pattern of potentials on the spindles may, if desired, be alternately positive and negative.

In any event, the induced potential on the fibres of the cotton bolls is always the opposite of the potential polarity of the spindles. This relation creates strong forces of attraction of the electrified cotton fibres toward one or more of the contiguous spindles.

The higher potential, such as 40 or 50 kv. impressed on the insulated crowder plates, lifters, top and sides of the tunnel and the like at the entrance to and in the picking tunnel, creates a pre-electrified conditioning of the cotton lint at the entrance to the picking tunnel, preparing it for the most effective and susceptible attachment to the electrified insulating rotating spindles. Cotton loosened or dislodged from the bolls is also levitated and sustained against falling to ground and individual fibres of the lint in all ripe cotton are made to stand out by the powerful electrostatic induction and to reach out for contact and electrostatic attachment to the picker spindles.

By such loosening and separating, the cotton fibres are in effect drawn out of the bolls and made to stand out radially and thus made more susceptible to the gathering by the spindles.

Because of these improved picking conditions and the far reaching attraction of the cotton fibres, the spacing between the spindles may be increased and fewer spindles be employed. This enables machines to be made lighter, smaller less expensive and to operate with lower power consumption. In the case of the Rust type machines the length of the picker carrying chains may be less and chains with pickers be provided to operate on both sides of a row.

In designing and arranging the necessary parts of the crowders, lifters, stalk guards, tunnel and the like, appropriate offsetting insulating studs and equivalent supports may be employed to maintain desirable air separation from grounded parts of the machine.

The high megohm resistors are important in the circuits which constantly charge the stationary insulated parts and intermittently or cyclically energize the picker spindles for the reason that they reduce in each circuit so protected the possible current in any unlikely or inadvertent sparks to the low order of microamperes. Therefore, there are no electrical hazards for operators accidentally contacting live circuits and any such discharges would be too weak for the minute currents to ignite or otherwise injure the cotton.

A further feature of the invention is the shortened time interval required in the picking zone because of the improved loosened condition of the cotton lint and its activation toward and into electrostatically held engagement with the spindles. This attachment lasts only while the cotton is being wound on the spindles, being completely released as the spindles recede from the picking zone. This leaves the gathered cotton free to expand and loosen on the spindles ready to be freely stripped. This complete release of the gathered cotton from the tapered spindles simplifies and reduces the work of the strippers and doffers.

The insulated covered spindles may be smooth, as illustrated, or they may be roughened, fluted or otherwise effectively shaped.

As a further possible variation the spindles may be flexible and resilient so as to yield on engagement with rocks or other objects. These flexible spindles may be of rubber or other suitable insulating or resilient plastic material over coiled wire or possibly straight spring wire cores, the latter carrying the electrostatic energizing potential and providing the necessary stiffness and reinforcement for the flexible material.

While for general purposes it may be considered preferable to insulate and electrify only the rotating spindles and preconditioning tunnel parts, it is within the contemplation of the invention to insulate and electrify the picker system as an integral unit, the insulation being used to isolate it electrically from the tractor and from ground.

By electrostatically charging and attracting the fibres to attachment with the picker spindles, the need for wetting the spindles as heretofore may be eliminated, thereby reducing much complicated equipment; but if wetting the spindles is found necessary or desirable the same may be continued as a part of the present process.

It is preferred, however, to keep the lint cotton in a dry condition so that loose cotton which otherwise might be dropped and lost, will be picked up and saved by the machine and the high grade of the cotton preserved and improved ginning operations accomplished.

Particularly satisfactory insulating coverings for the picker spindles have been found to be polyethylene and polytetrafluoroethylene or Teflon. These substances resist staining, gumming and dirtying and possess a high adhesion coefficient for holding the cotton during the wrapping or winding operation, especially so with the silicone overcoating.

All of the insulating coverings or coatings herein mentioned, when properly applied, serve to prevent arcing and sparking or discharge from the spindles to the cotton and cotton plants and to obviate dissipation of energy and unnecessary current drain.

The resilient form of insulated spindle described, in addition to being self-protective and fortifying the machine parts against shock, has the distinct advantage that it can be produced at low cost by molding or other inexpensive methods. The molded spindles instead of being entirely smooth, may have longitudinal flutes in the surface to provide many flexible ribs which will readily pick and wrap the cotton.

While generally the charging of the spindles, crowders or other insulated parts may be constant or continuous for the time that they are charged, it is contemplated that such charging may be intermittent, interrupted or pulsing and also that it may be of a varying or variable potential.

The insulating covers of the picker spindles tend to keep themselves clean, but if any foreign matter such as dust from the field tends to accumulate it may be readily washed off, possibly with use of a detergent, and these operations may be performed in the field. The fewer number necessary and wider spacing permitted the spindles simplifies any such washing operations.

Fig 11 indicates in a general way how the cotton picking tunnel, or parts constituting the tunnel, may be supported in insulated relation on the grounded portions of the machine by suitable standoff insulators or insulating studs 66.

The "tunnel," as it has been called, is simply a channel or passage on the machine, open at the bottom to pass over the cotton plants and having opposing side walls spaced to guide the plants while the machine is passing over them and to hold them confined sufficiently for the picker spindles entering one side of the tunnel to approach and penetrate the bolls.

An example of a suitable tunnel construction is illustrated in Figs. 4 and 5 of the Rust Patent 2,085,046, which form the general basis for present Figs. 1 and 2.

The structure of this plant guiding passage or channel may be variously modified and the same is true as to various other details of the machine.

Structure of the picker spindles in particular may be varied and in so varying, companion or cooperative parts of the machine may be modified. Thus, with the contact rollers of the spindles at an intermediate point, as at 24 in Figs. 3 and 4, the contact strips 32 for engagement by these rollers will be located as shown in Fig. 2; whereas, with contact rollers at the outer ends of the spindles, as at 29 in Figs. 5 and 6, the contact strips will be located at the outer ends of the spindles as shown in Fig. 11.

The construction of the plant guiding and confining channel may vary so widely that only a short portion at the entering end of the same is indicated in the diagrammatic view, Fig. 11.

What is claimed is:

1. Mobile cotton picker having plant guiding means including a downwardly open channel disposed to receive, guide and confine standing plants in travel of the machine over a cotton field, rotary cotton gathering picker spindles movably mounted on said machine in position to enter said channel at one side, mechanical drive means connected to rotate and project said spindles into and withdraw them from said channel in travel of the machine, insulating bearing means for electrically insulating said rotating spindles from the ground, and electrical generating means on said machine connected to electrostatically charge said picker spindles on projection of the same into and to discharge them upon withdrawal from said channel and whereby to inductively energize and attract cotton fibre within the inductive field of energized spindles within said plant guiding means toward and into electrostatically coupled engagement with said rotating spindles and then to electrically release electrostatically gathered cotton from the spindles as they are withdrawn from said plant guiding means.

2. The invention according to claim 1, in which said plant guiding means are insulated from ground and electrical connections are provided on the machine for electrostatically charging said insulated plant guiding means to the opposite polarity of the picker spindles.

3. The invention according to claim 1, in which said plant guiding means are insulated from ground and electrical connections are provided on the machine for electrostatically charging said insulated plant guiding means to higher potential than said picker spindles.

4. The invention according to claim 1, in which said means for electrostatically charging and discharging said picker spindles include tracks arranged on paths in the line of travel of said spindles and said spindles have conducting elements engageable with and disengageable from said tracks.

5. The invention according to claim 4, in which said picker spindles are arranged in spaced rows and said tracks are disposed between said rows of spindles in position for engagement by said conducting elements on the spindles at opposite sides of said tracks.

6. The invention according to claim 1, in which said picker spindles have electrically conductive cores for electrostatically charging and discharging said spindles, insulating coatings on said conductive cores through which the cotton is charged by inductive action and insulated bearings for said conductive cores.

7. The invention according to claim 1, in which said spindles are electrically insulated by a coating of tough, durable non-hydroscopic insulating material having the characteristics of polyethylene.

8. The invention according to claim 1, in which said spindles are electrically insulated by a coating of tough, durable non-hydroscopic insulating material having the characteristics of polytetrafluoroethylene.

9. The invention according to claim 1, in which said spindles are electrically insulated by a coating of tough, durable non-hydroscopic insulating material and an overcoating in the nature of silicone resin.

10. The invention according to claim 1, with insulated guards mounted opposite the tips of said insulated picker spindles.

References Cited in the file of this patent
UNITED STATES PATENTS

| | | |
|---|---|---|
| 103,986 | Cooke | June 7, 1870 |
| 602,076 | Hamerschlag et al. | Apr. 12, 1898 |
| 1,926,338 | Johnston | Sept. 12, 1933 |
| 2,058,513 | Rust et al. | Oct. 27, 1936 |
| 2,140,631 | Johnston | Dec. 20, 1938 |
| 2,497,777 | Baker et al. | Feb. 14, 1950 |
| 2,546,185 | Hagen | Mar. 27, 1951 |
| 2,576,567 | Brown | Nov. 27, 1951 |
| 2,668,410 | Bramblett | Feb. 9, 1954 |